US012520076B2

(12) United States Patent
Shen et al.

(10) Patent No.: US 12,520,076 B2
(45) Date of Patent: Jan. 6, 2026

(54) LOUDSPEAKER STRUCTURE WITH REFLECTING CONE

(71) Applicant: ZHONGSHAN CITY RICHSOUND ELECTRONIC INDUSTRIAL LTD, Guangdong Province (CN)

(72) Inventors: Yang Shen, Shenzhen (CN); Sheng Fu, Zhongshan (CN); Quanbiao Liang, Zhongshan (CN)

( * ) Notice: Subject to any disclaimer, the term of this patent is extended or adjusted under 35 U.S.C. 154(b) by 144 days.

(21) Appl. No.: 18/582,631

(22) Filed: Feb. 20, 2024

(65) Prior Publication Data

US 2025/0203275 A1 Jun. 19, 2025

(30) Foreign Application Priority Data

Dec. 15, 2023 (CN) ......................... 202311736173.5

(51) Int. Cl.
*H04R 1/28* (2006.01)
*H04R 1/02* (2006.01)

(52) U.S. Cl.
CPC ........... *H04R 1/2834* (2013.01); *H04R 1/025* (2013.01); *H04R 2400/11* (2013.01)

(58) Field of Classification Search
CPC ... H04R 1/2834; H04R 1/025; H04R 2400/11
USPC .......................................................... 381/160
See application file for complete search history.

(56) References Cited

U.S. PATENT DOCUMENTS

2012/0114148 A1* 5/2012 Goh Kong San .... H04R 1/2834 381/186
2014/0029782 A1* 1/2014 Rayner .................... H04R 1/02 381/386

FOREIGN PATENT DOCUMENTS

CN 111246351 A * 6/2020 ............... H04R 9/02
EP 3684077 A1 * 7/2020 ............. G10H 1/047

* cited by examiner

*Primary Examiner* — Sean H Nguyen
(74) *Attorney, Agent, or Firm* — Che-Yang Chen; Law Office of Michael Chen

(57) ABSTRACT

A loudspeaker structure with a reflecting cone may include an active loudspeaker unit and a reflecting cone, wherein the active loudspeaker unit comprises a bracket, a cone, an active cone dangling edge and a faying surface, the reflecting cone comprises a reflecting counterweight surface and a reflecting cone dangling edge, the reflecting cone dangling edge is arranged around the edge of the reflecting counterweight surface, and the faying surface is arranged around the reflecting cone dangling edge and fixed with the reflecting cone dangling edge. In the present application, the bracket and the faying surface of the active loudspeaker unit are expanded to surround the reflecting cone in the faying surface, and the reflecting cone is supported by the faying surface of the active loudspeaker unit, so the reflecting cone of this product does not need the bracket.

8 Claims, 5 Drawing Sheets

LOUDSPEAKER STRUCTURE WITH REFLECTING CONE

FIELD OF THE INVENTION

The present invention relates to a small-sized wearable loudspeaker, in particular to a loudspeaker structure with a reflecting cone.

BACKGROUND OF THE INVENTION

At present, the reflecting cone (also called passive cone) is used in many sound box designs. The reflecting cone is usually similar to the active loudspeaker unit in shape. However, without voice coil and drive magnet, the reflecting cone is usually used to tune bass and increase the low frequency effect of the sound box so that designers can adjust the overall timbre of the sound box. Horns used shall not be too large due to volume restriction especially for some small sound boxes and generally have dimensions of 2 inches or less. In this way, the horn diaphragm pushes a small amount of air at each vibration due to small caliber thereof, and the bass perception is directly related to the volume of air pushed by the horn, so the natural defects of the small sound boxes lead to lack of bass, and the reflecting cone can solve this problem better. Therefore, the reflecting cone is widely used in small-sized loudspeaker devices.

However, in the previous design, the reflecting cone and the active loudspeaker are installed separately in the sound box and thus both need support of a bracket, and the reflecting cone needs a lapping edge to be connected with the bracket. However, the space of the small sound box is limited, and the lapping edge of the reflecting cone and the bracket need certain surface space and inner space, so the miniaturization effect of the sound box with such structure is not good enough. In view of the above situation, the applicant designs a loudspeaker structure with a reflecting cone to solve the above problems.

SUMMARY OF THE INVENTION

To overcome the defects in the prior art, the present invention provides a loudspeaker structure with a reflecting cone.

A technical solution adopted to solve the technical problem by the present invention is as follows:

A loudspeaker structure with a reflecting cone, comprising an active loudspeaker unit and a reflecting cone, wherein the active loudspeaker unit comprises a bracket, a cone, an active cone dangling edge and a faying surface, the reflecting cone comprises a reflecting counterweight surface and a reflecting cone dangling edge, the reflecting cone dangling edge is arranged around the edge of the reflecting counterweight surface, and the faying surface is arranged around the reflecting cone dangling edge and fixed with the reflecting cone dangling edge.

The bracket comprises a housing, an inner barrel arranged in the housing, and a connecting rod for connecting the inner barrel and the housing, a magnet part of the active loudspeaker unit is installed in the inner barrel, the inner wall of the housing is provided with a support surface I, and the faying surface is fixed with the end face of the inner barrel and the support surface I.

The shape of the reflecting counterweight surface is a crescent, racetrack or circle.

The connecting rod is provided with a positioning column, and a circuit board located in the housing is provided with a positioning hole matched with the positioning column.

The reflecting cone dangling edge is connected with the faying surface by hot melting.

The shape of the reflecting counterweight surface is a crescent, and both ends of the crescent are rounded.

The loudspeaker structure further comprises a bottom shell, wherein the bottom shell is fixed with the housing so as to close the bottom surface of the bracket.

The end face of the inner barrel is provided with a support surface II, and the faying surface is fitted and fixed with the support surface II.

The present invention has the following beneficial effects: in the present application, the bracket and the faying surface of the active loudspeaker unit are expanded to surround the reflecting cone in the faying surface, and the reflecting cone is supported by the faying surface of the active loudspeaker unit, so the reflecting cone of this product does not need the bracket. Although the bracket and the faying surface of the active loudspeaker unit are expanded, the surface space and inner space occupied by the active loudspeaker unit and the reflecting cone can be reduced compared with the previous structure with two brackets, and the volume of the sound box can be further reduced in the case of limited space of the small sound box, and further miniaturization can be achieved in the case of ensuring the same tone quality.

DESCRIPTION OF DRAWINGS

The present invention will be further described below in combination with the drawings and the embodiments.

DETAILED DESCRIPTION AND EMBODIMENTS

Figure 1:
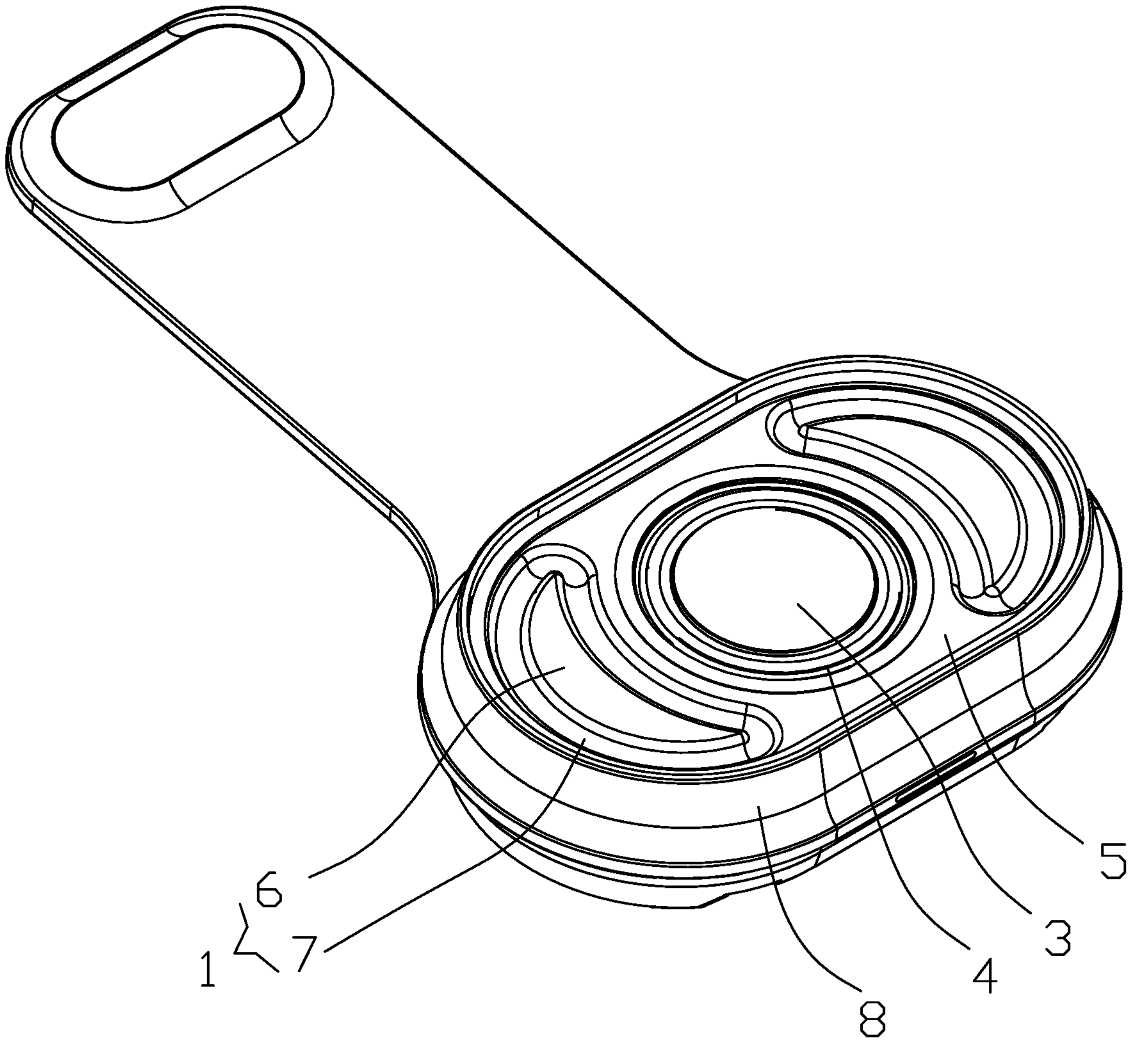
FIG. 1 is a structural diagram of a loudspeaker with a mesh cover removed in the present invention.

The advantages and the features of the present disclosure and the implementation method thereof will be illustrated with reference to the following embodiments described in the drawings. However, the present disclosure may be reflected in different forms and shall not be interpreted to be limited to the embodiments described herein. On the contrary, the embodiments are provided to make the present disclosure comprehensive and complete, and the scope of the present disclosure will be sufficiently communicated to those skilled in the art. In addition, the present disclosure is defined only by the scope of the claims.

The shapes, dimensions, proportions, angles, and numbers disclosed in the drawings used to describe the embodiments of the present disclosure are examples only, and thus the present disclosure is not limited to the details shown. The same reference signs in the whole description refer to same elements. In the following description, when the detailed description of a relevant known function or configuration is determined to unnecessarily obscure the emphasis of the present disclosure, the detailed description will be omitted.

In the case that "comprise", "have" and "include" described in this description are used, other components may be added unless "only" is used. A term in a singular form may comprise a plural form unless otherwise indicated.

When an element is interpreted, although not explicitly described, the element is understood to comprise an error range.

When positional relationships are described, for example, when the positional relationships are described as "on", "above", "below" and "adjacent", unless "closely adjacent" or "directly" is used, one or more parts may be arranged between two other parts.

When time relationships are described, for example, when time sequences are described as "after", "subsequently", "next" and "before", unless "just" or "directly" is used, discontinuous situations may be included.

It should be understood that although the terms "first", "second", etc. may be used herein to describe various elements, these elements should not be limited by these terms. These terms are used only to distinguish one element from other elements. For example, a first element may be called a second element, and similarly, the second element may be called the first element without deviating from the scope of the present disclosure.

As may be fully understood by those skilled in the art, the features of different embodiments of the present disclosure may be partially or fully coupled or combined with each other, and may collaborate with each other and may be technically driven in various modes. The embodiments of the present disclosure may be executed independently of each other or together in an interdependent relationship.

Figure 2:
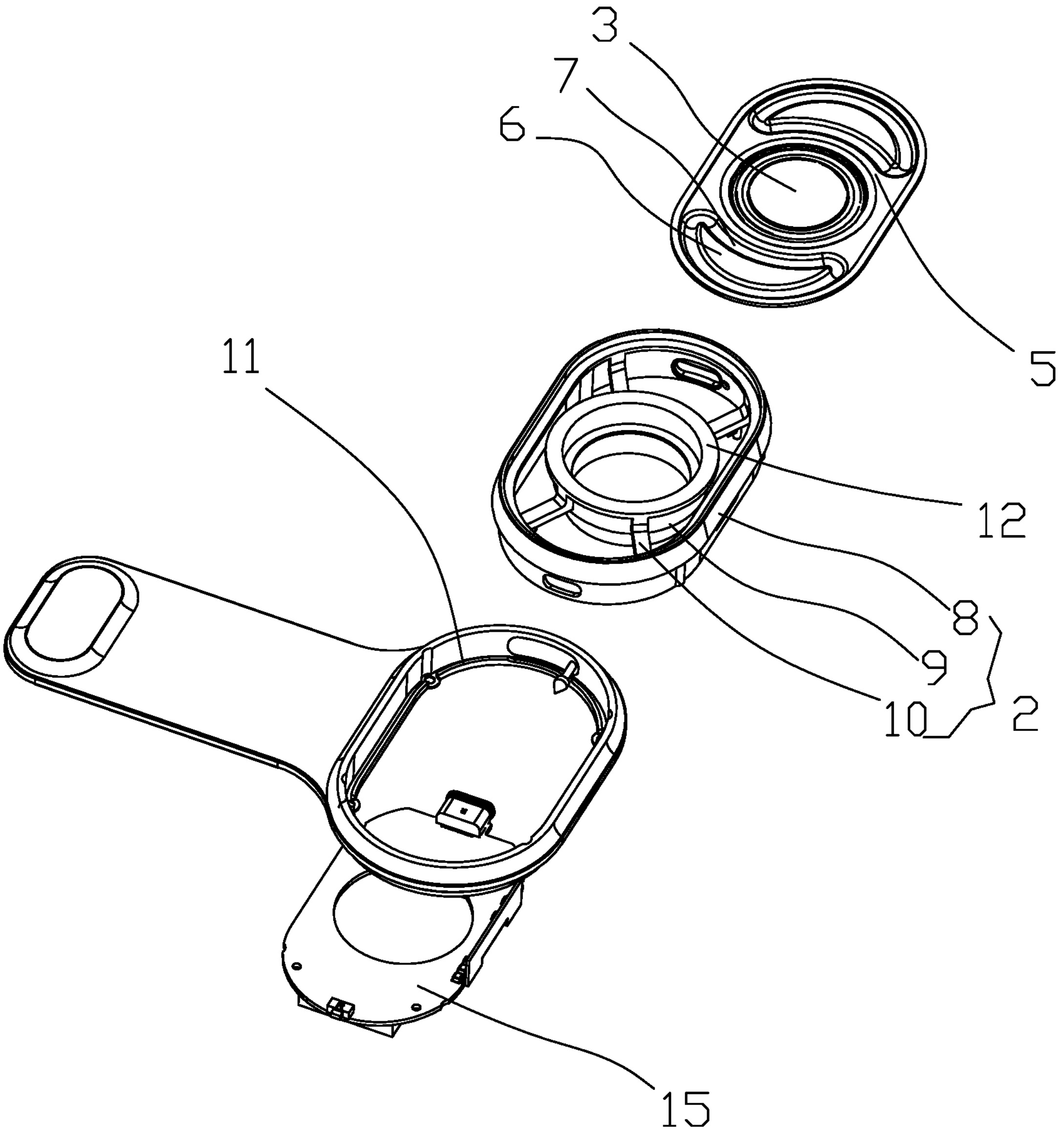
FIG. 2 is an exploded structural diagram of a loudspeaker with a mesh cover removed in the present invention.
Figure 3:
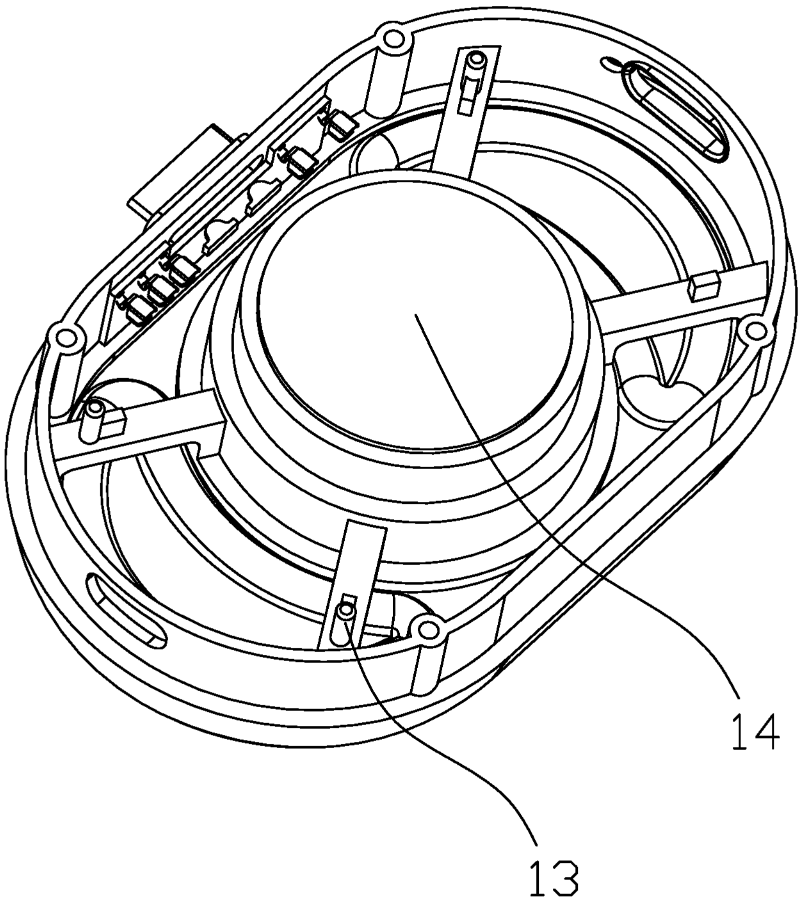
FIG. 3 is an internal structural diagram of a loudspeaker with a bottom shell removed in the present invention.

Referring to FIG. 1 to FIG. 3, the present invention discloses a loudspeaker structure with a reflecting cone. This product is a small-sized wearable loudspeaker which of course is also suitable for loudspeakers of other dimensions and shapes, and this structure is certainly also applied to other devices requiring miniaturized speakers such as laptop computers, TV sets and displays, comprising an active loudspeaker unit and a reflecting cone 1, wherein the active loudspeaker unit comprises a bracket 2, a cone 3, an active cone dangling edge 4 and a faying surface 5, the reflecting cone comprises a reflecting counterweight surface 6 and a reflecting cone dangling edge 7, the reflecting cone dangling edge 7 is arranged around the edge of the reflecting counterweight surface 6, and the faying surface 5 is arranged around the reflecting cone dangling edge 7 and fixed with the reflecting cone dangling edge 7. With the above structure, the bracket 2 and the faying surface 5 of the active loudspeaker unit are expanded to surround the reflecting cone in the faying surface 5, and the reflecting cone is supported by the faying surface 5 of the active loudspeaker unit, so the reflecting cone 1 of this product does not need the bracket 2.

In the above structure, the reflecting cone dangling edge 7, the active cone dangling edge 4 and the faying surface 5 are made of rubber material, the reflecting cone dangling edge 7 and the active cone dangling edge 4 both have a conventional U-groove structure, the faying surface 5 is provided with a small lapping edge in the position where the faying surface 5 is fitted with the reflecting cone dangling edge 7 and the active cone dangling edge 4, and the lapping edge is bent, then overlapped with the reflecting cone dangling edge 7 and the active cone dangling edge 4, and connected by hot melting or other fixed forms, or connected by means of glue bonding. The bracket 2 of the present application is made of plastic material or metal such as iron or aluminum, and the faying surface 5 is bonded to the bracket 2. The shape design of the faying surface 5 is determined according to the shape and connection needs of the bracket 2, and the main requirements are reliable fixation and uniform stress.

Therefore, the faying surface 5 of the present application is fixed in two positions, the overall edge of the faying surface 5 is fixed with the bracket 2, the faying surface 5 has an annular fixed surface in the middle, and the reflecting cone is located between the edge and the annular fixed surface so as to be stressed uniformly.

As shown in the figures, the bracket 2 comprises a housing 8, an inner barrel 9 arranged in the housing 8, and a connecting rod 10 for connecting the inner barrel 9 and the housing 8, a magnet part 14 of the active loudspeaker unit is installed in the inner barrel 9, the inner wall of the housing 8 is provided with a support surface I 11, and the faying surface 5 is fixed with the end face of the inner barrel 9 and the support surface I 11. Since the housing 8 of the bracket 2 of the present application shall be used not only as the support of the faying surface 5, but also as part of the housing of the product, the inner wall of the housing 8 is provided with the support surface I 11, and fitted and supported with the faying surface 5 through the support surface I 11. Moreover, in order to achieve more stable support and more uniform stress, the end face of the inner barrel 9 is fitted and supported with the faying surface 5. As a further structure, the end face of the inner barrel 9 is provided with a support surface II 12, the faying surface 5 is fitted and fixed with the support surface II 12, and the support surface II 12 expands the contact area, so the stickup is more firm.

The housing 8 of the present application is shaped like a waist, and the inner barrel 9 is circular. Of course, the shape of the housing 8 is designed according to the needs and thus can be a rectangle, ellipse or other shapes. The inner barrel 9 is circular and is used to install the magnet and other components of the active loudspeaker unit. Since the active loudspeaker unit adopts the technology of the existing structure, how the inner barrel 9 is fixed with the magnet and other components is not described in detail.

Figure 4:
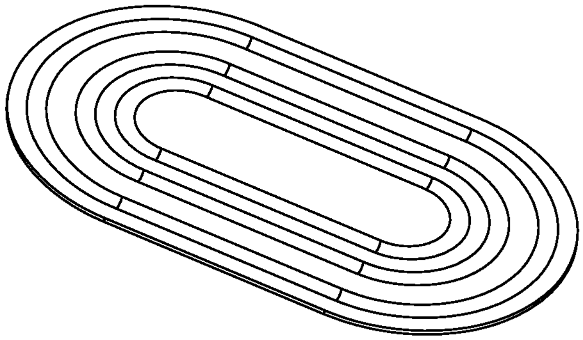
FIG. 4 is a structural diagram of a loudspeaker with a racetrack-shaped reflecting cone.
Figure 5:
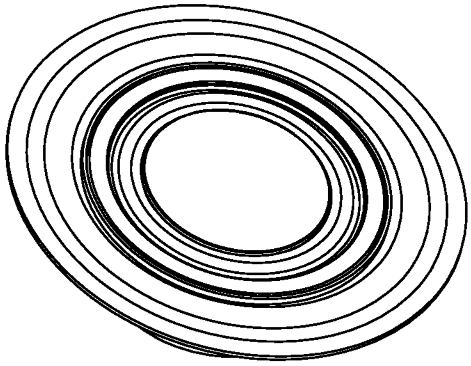
FIG. 5 is a structural diagram of a loudspeaker with a circular reflecting cone.

As shown in the figures, the shape of the reflecting counterweight surface 6 of the present application is preferably a crescent, and of course, can also be a racetrack as shown in FIG. 4 or a circle as shown in FIG. 5. Both ends of the crescent are relatively sharp, and the reflecting counterweight surface 6 is easily unbalanced when vibrating to reduce the tone quality, so both ends of the crescent are rounded.

As shown in the figures, the connecting rod 10 is provided with a positioning column 13, and a circuit board located in the housing 8 is provided with a positioning hole matched with the positioning column 13. The circuit board of the present application is also supported by the bracket 2, thus saving space and having compact structure, which is convenient for installation through the positioning column 13.

As shown in the figures, the loudspeaker structure further comprises a bottom shell 15, and the bottom shell 15 is fixed with the housing 8 so as to close the bottom surface of the bracket 2. Such structure is convenient for manufacturing and assembly.

The loudspeaker structure with a reflecting cone provided in the embodiments of the present invention is described in detail above. Specific individual cases are applied herein for elaborating the principle and embodiments of the present invention. The illustration of the above embodiments is merely used for helping to understand the method of the present invention and the core thought thereof. Meanwhile, for those ordinary skilled in the art, specific embodiments and the application scope may be changed in accordance with the thought of the present invention. In conclusion, the contents of the description shall not be interpreted as a limitation to the present invention.

What is claimed is:

1. A loudspeaker structure with a reflecting cone, comprising an active loudspeaker unit and a reflecting cone, wherein the active loudspeaker unit comprises a bracket, a cone, an active cone dangling edge and a faying surface, the reflecting cone comprises a reflecting counterweight surface and a reflecting cone dangling edge, the reflecting cone dangling edge is arranged around the edge of the reflecting counterweight surface, and the faying surface is arranged around the reflecting cone dangling edge and fixed with the reflecting cone dangling edge.

2. The loudspeaker structure with a reflecting cone according to claim 1, wherein the bracket comprises a housing, an inner barrel arranged in the housing, and a connecting rod for connecting the inner barrel and the housing, a magnet part of the active loudspeaker unit is installed in the inner barrel, the inner wall of the housing is provided with a support surface I, and the faying surface is fixed with the end face of the inner barrel and the support surface I.

3. The loudspeaker structure with a reflecting cone according to claim 2, wherein the connecting rod is provided with a positioning column, and a circuit board located in the housing is provided with a positioning hole matched with the positioning column.

4. The loudspeaker structure with a reflecting cone according to claim 2, wherein the end face of the inner barrel is provided with a support surface II, and the faying surface is fitted and fixed with the support surface II.

5. The loudspeaker structure with a reflecting cone according to claim 1, wherein the shape of the reflecting counterweight surface is a crescent, racetrack or circle.

6. The loudspeaker structure with a reflecting cone according to claim 3, wherein the shape of the reflecting counterweight surface is a crescent, and both ends of the crescent are rounded.

7. The loudspeaker structure with a reflecting cone according to claim 1, wherein the reflecting cone dangling edge is connected with the faying surface by hot melting.

8. The loudspeaker structure with a reflecting cone according to claim 1, further comprising: a bottom shell, wherein the bottom shell is fixed with the housing so as to close the bottom surface of the bracket.

* * * * *